April 9, 1963 R. NITSCHE ET AL 3,085,184

FERROELECTRIC DEVICES

Filed April 12, 1960

INVENTORS
ENNIO FATUZZO &
RUDOLF NITSCHE

BY W. S. Hill
AGENT

United States Patent Office 3,085,184

Patented Apr. 9, 1963

3,085,184
FERROELECTRIC DEVICES

Rudolf Nitsche and Ennio Fatuzzo, Zurich, Switzerland, assignors to Radio Corporation of America, a corporation of Delaware Filed Apr. 12, 1960, Ser. No. 21,689
5 Claims. (Cl. 317—262)

This invention relates to ferroelectric devices and, particularly, to improved ferroelectric devices including a body of teteramethylammonium-trichloro-mercuriate or a crystallographic isomorph thereof as the active ferroelectric material.

A ferroelectric material is a material which displays a spontaneous polarization of electric dipoles that can be reversed by an attainable electric field. This is manifested by a ferroelectric hysteresis loop when the polarization of a crystal of the material is plotted against an applied electric field. Some previously known ferroelectrics are: Rochelle salt, potassium dihydrogen phosphate, barium titanate, guanidinium aluminum sulfate hexahydrate, thiourea, colemanite, and triglycine sulfate.

For commercial uses, it is desirable that the ferroelectric material be easily prepared as discrete crystals, be capable of reversing the spontaneous polarization at room temperature, have a high spontaneous polarization, and have a substantially square ferroelectric hysteresis loop.

One object of the invention is to provide improved ferroelectric devices.

Another object is to provide improved ferroelectric devices useful at room temperature.

Tetramethylammonium-trichloro-mercuriate $$N(CH_3)_4HgCl_3$$

and its crystallographic isomorphs, which are previously known compounds, have been found to possess the unusual and unexpected property of ferroelectricity. These materials form in platelike crystals. The ferroelectric properties of these materials occur perpendicular to the major faces of the plates.

An improved device of the invention which uses the newly discovered ferroelectric properties includes a body of material selected from the group consisting of tetramethylammonium-trichloro-mencuriate and crystallographic isomorphs thereof and means for applying an electric field to said body. A typical device comprises a crystal of tetramethylammonium-trichloro-mercuriate having opposed major faces spacing a pair of electrodes, said electrodes being capable of producing a substantial electric field perpendicular to the major faces of said crystal when connected to a suitable source of voltage.

Figure 1:
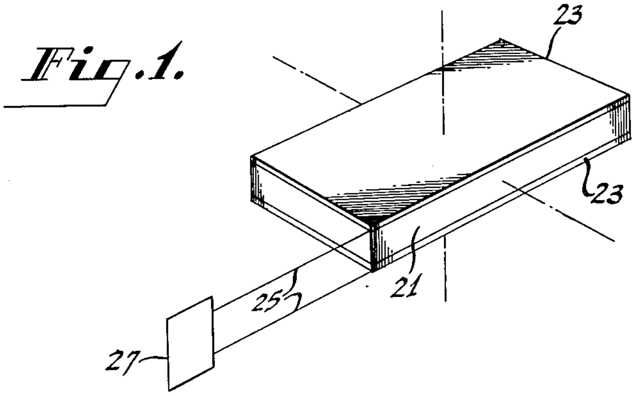
Figure 2:
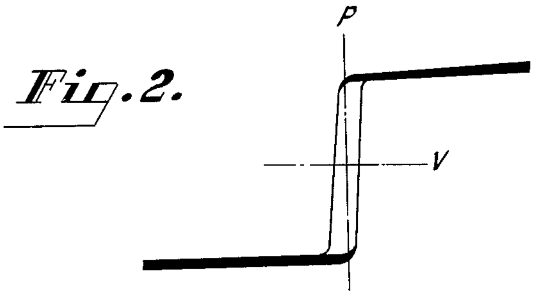

The invention is described in greater detail by reference to the accompanying drawing in which:

FIGURE 1 is a perspective view of an idealized crystal of tetramethylammonium-trichloro-mercuriate with electrodes applied to the opposed major faces thereof and showing schematically electrical connections thereto, and FIGURE 2 is a typical curve illustrating the substantially square ferroelectric hysteresis loop of the device of FIGURE 1.

*Example.*—To prepare crystals of tetramethylammonium-trichloro-mercuriate, slowly evaporate a quantity of a saturated aqueous solution containing equimolar parts of tetramethylammonium-chloride, $N(CH_3)_4Cl$, and mercuric chloride, $HgCl_2$, at about 30° C. in air with constant stirring of the solution. Upon evaporation of a portion of the water, crystals of orthorhombic tetramethylammonium-trichloro-mercuriate crystallize as small clear plates having an average size of about 6 x 2 x 0.2 mm. The crystals are removed from the solution, dried, and are now ready for use in a ferroelectric device. Other methods of preparing the crystals may, of course, be used. For example, cooling a hot saturated aqueous solution containing equilmolar parts of tetramethylammonium chloride and mercuric chloride will produce suitable plate-like crystals. As a matter of convenience, the crystals may be cleaved in a plane parallel to the major faces of the crystal to provide crystals of the desired thickness. Cleavage of the crystal is not a necessary step in preparing the ferroelectric devices of the invention.

Referring to FIGURE 1, electrodes 23 are applied to opposite major crystal faces of one of the plate-like crystals 21 of tetramethylammonium-trichloro-mercuriate. Electrodes 23 are most conveniently prepared by applying a quantity of air-drying silver paste upon the surfaces to be electroded. Such silver paste may comprise, for example, silver particles dispersed in a suitable binder such as cellulose nitrate. Another method for producing electrodes 23 is to evaporate a noble metal, such as silver, in a vacuum upon the surfaces to be electroded. Other metals, such as gold, platinum, and indium, may be used as the electrode materials. It is preferable, but not necessary, to adherently attach the electrode material to the surfaces of the crystal. Optionally, the electrodes 23 may be physically separate from the crystal 21 and merely applied to the surface thereof. Electrodes 23 which make good electrical contact uniformly to the crystal surface are preferred, so that there is a negligible capacitance between the crystal 21 and the electrode 23. Lead wires 25 are attached to each of the electrodes 23. The electroded crystal is now ready for use as a ferroelectric device.

An electroded crystal about 0.5 mm. thick is connected to an adjustable voltage source 27. Upon applying a 60 cycle A.C. having a peak voltage of about 30 volts, the device exhibits a remarkably square, symmetric ferroelectric hysteresis loop at room temperature. FIGURE 2 shows the ferroelectric hysteresis loop of the device of FIGURE 1 held at room temperature. The ordinate represents the spontaneous polarization P in microcoulombs/cm.$^2$ and the abscissa represents the applied field V in volts. In FIGURE 2, the spontaneous polarization $P_s$ with zero applied field is about 1.3 microcoulombs/cm.$^2$ and the coercive voltage is about 20 volts. This corresponds to a coercive field $E_c$ of about 400 volts/cm. The material is ferroelectric between −80° C. and +200° C. Decomposition of the crystal takes place at about +200° C. The Curie temperature of tetramethylammonium-trichloro-mercuriate is believed to be above the decomposition temperature.

Tetramethylammonium-trichloro-mercuriate is representative of a new class of ferroelectric materials not previously known. Examples of other materials in the same class which are ferroelectric are: tetramethylammonium-tribromo-mercuriate $N(CH_3)_4HgBr_3$ and tetramethylammonium-triiodo-mercuriate $N(CH_3)_4HgI_3$. All of the materials in the same chemical family as, and crystallographically isomorphic with, tetramethylammonium-trichloro-mercuriate exhibit ferroelectric properties. Such isomorphs may be obtained by elemental or radial substitution in the compound. Examples of substitutions which frequently give isomorphs are: partial or complete isotropic substitutions such as deuterium for hydrogen H, ethyl $C_2H_5^+$, butyl $C_3H_7^+$, phenyl $C_6H_5^+$, or other organic radicals for methyl $CH_3^+$; bromide $Br^-$, iodide $I^-$, cyanide $CN^-$, or thiocyanide $CNS^-$ for chloride; bivalent metal ions of similar ionic radii such as cadmium (1.03 A.), zinc (0.83 A.), calcium (1.06 A.), copper (1.01 A.), strontium (1.27 A.), and lead (1.22 A.) for mercury (1.12 A.); and ions such as phosphorus, arsenic or antimony for nitrogen. The general class includes isomorphs having the formula:

$$XY_4ZHa_3$$

wherein:

X may be nitrogen, phosphorus, arsenic, antimony, or combinations thereof,

Y may be a monovalent organic radical or ion such as hydrogen, deuterium, alkyl or aryl such as methyl $CH_3$, ethyl $C_2H_5$, butyl $C_3H_7$, phenyl $C_6H_5$ or combinations thereof, Z may be a bivalent metal ion such as: mercury, cadmium, zinc, calcium, copper, strontium, lead or combinations thereof, Ha may be a halide ion such as chloride, bromide, iodide, a pseudohalide ion such as cyanide, thiocyanide, or combinations thereof.

The ferroelectric devices of the invention are useful in various applications, for example, in conjunction with electroluminescent systems, computers, electronic memory devices and binary switches. Such ferroelectric devices are discussed in more complete detail in H. Sachse, Ferroelektrica, Springer-Verlag OHS, Berlin, Germany, 1956, pp. 144 to 156.

There have been described improved ferroelectric devices including a body of tetramethylammonium-trichloro-mercuriate or a crystallographic isomorph thereof.

What is claimed is:

1. A device comprising a ferroelectric body of material selected from the group consisting of tetramethylammonium-trichloro-mercuriate and crystallographic isomorphs thereof, and means for applying an electric field to said body.

2. A device comprising a ferroelectric body of material crystallographically isomorphic with tetramethylammonium-trichloro-mercuriate and selected from the group consisting of compounds having the formula:

$$XY_4ZHa_3$$

wherein:

X is selected from the group consisting of nitrogen, phosphorus, arsenic, antimony, and combinations thereof, Y is selected from the group consisting of hydrogen, deuterium, alkyl, aryl, and combinations thereof, Z is selected from the group consisting of mercury, cadmium, zinc, calcium, copper, strontium, lead, and combinations thereof, Ha is selected from the group consisting of chloride, bromide, iodide, cyanide, thiocyanide, and combinations thereof, and means for applying an electric field to said body.

3. A device comprising a ferroelectric platelike crystal of $N(CH_3)_4HgCl_3$ having two major opposed faces, and a pair of spaced electrodes attached to each of said major faces respectively.

4. A device comprising a ferroelectric platelike crystal of $N(CH_3)_4HgBr_3$ having two major opposed faces, and a pair of spaced electrodes attached to each of said major faces respectively.

5. A device comprising a ferroelectric platelike crystal of $N(CH_3)_4HgI_3$ having two major opposed faces, and a pair of spaced electrodes attached to each of said major faces respectively.

References Cited in the file of this patent

UNITED STATES PATENTS

| | | |
|---|---|---|
| 2,899,321 | Mackrin | Aug. 11, 1959 |
| 2,928,032 | Daniel | Mar. 8, 1960 |
| 2,944,200 | Solomon | July 5, 1960 |

OTHER REFERENCES

Physical Review, vol. 105, No. 1, page 344, Jan. 1, 1957.